UNITED STATES PATENT OFFICE.

LUCAS PETRON KYRIAKIDES AND RICHARD BLAIR EARLE, OF BOSTON, MASSACHUSETTS, ASSIGNORS TO HOOD RUBBER COMPANY, OF BOSTON, MASSACHUSETTS, A CORPORATION OF MASSACHUSETTS.

PROCESS OF PRODUCING ISOPRENE.

1,094,222.     Specification of Letters Patent.     Patented Apr. 21, 1914.

No Drawing.     Application filed November 11, 1911. Serial No. 659,828.

*To all whom it may concern:*

Be it known that we, LUCAS P. KYRIAKIDES and RICHARD B. EARLE, citizens of the United States, residing at Boston, Massachusetts, have invented certain new and useful Improvements in Processes of Producing Isoprene, of which the following is a specification.

Our invention relates to a new and valuable process for producing isoprene (2-methylbutadiene - 1.3′ - β - methyldivinyl) which is a valuable hydrocarbon useful in the preparation of rubber or terpenes.

The new process consists in passing the vapors of isoamylene oxid of the formula:

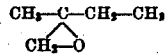

over heated dehydrating catalytics such as aluminum silicate at temperatures from 400°–600° C., at pressures less than 60 millimeters of mercury.

In order to illustrate the new process more fully, the following example is given: Isoamylene oxid is distilled slowly over aluminum silicate, either powdered or in briquet form, which is kept at the temperature of 450° C. and the pressure of one millimeter of mercury by a vacuum pump. The products of the reaction are condensed in suitable receivers by means of refrigerating agents and purified by fractional distillation. The fraction boiling at 32°–37° C., consists of nearly pure isoprene and may be used in this state of purity. The other products of the reaction are high boiling products of unknown nature, valeraldehyde and traces of trimethylethelene. The yield of isoprene, containing only traces of trimethylethylene, is over 70% of the theory. The formation of isoprene takes place by the splitting off of water according to the equation:

$$C_5H_{10}O = C_5H_8 + H_2O.$$

The process is useful at the ordinary pressure but the yield of isoprene is largely increased by carrying out the operation *in vacuo*.

We claim:

1. A process for producing isoprene, which comprises passing the vapors of an isoamylene oxid over a heated dehydrating catalytic.

2. A process for producing isoprene, which comprises passing the vapors of an isoamylene oxid over a heated dehydrating catalytic at less than atmospheric pressure.

3. A process for producing isoprene, which comprises passing the vapors of an isoamylene oxid over heated aluminum silicate.

4. A process for producing isoprene which comprises passing the vapors of an isoamylene oxid over heated aluminum silicate at less than atmospheric pressure.

5. A process for producing isoprene which comprises passing the vapors of an isoamylene oxid over a dehydrating catalytic at a temperature between 400° and 600° C.

6. A process for producing isoprene which comprises passing the vapors of an isoamylene oxid over a dehydrating catalytic at a temperature between 400° and 600° C. *in vacuo* at pressures less than 60 millimeters of mercury.

7. A process for producing isoprene which comprises passing the vapors of an isoamylene oxid over an aluminum silicate at a temperature between 400° and 600° C. *in vacuo* at pressures less than 60 millimeters of mercury.

8. The process for producing isoprene which consists in passing the vapors of isoamylene oxid of the formula

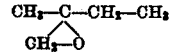

over heated dehydrating catalytics at temperatures from 400°–600° C., *in vacuo*, at pressures less than 60 millimeters of mercury.

9. The process for producing isoprene which consists in passing the vapors of isoamylene oxid of the formula:

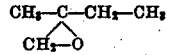

over aluminum silicate at temperatures from 400°–600° C., *in vacuo*, at pressures less than 60 millimeters of mercury.

In testimony whereof, we affix our signatures in presence of two witnesses.

LUCAS PETRON KYRIAKIDES.
    RICHARD BLAIR EARLE.

Witnesses:
    JESSIE R. MOTT,
    M. ALICE HAGARTY.